United States Patent
Wu

(10) Patent No.: US 11,169,638 B2
(45) Date of Patent: Nov. 9, 2021

(54) METHOD AND APPARATUS FOR SCANNING TOUCH SCREEN, AND MEDIUM

(71) Applicant: BEIJING XIAOMI MOBILE SOFTWARE CO., LTD., Beijing (CN)

(72) Inventor: Tsang-chih Wu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/699,585

(22) Filed: Nov. 30, 2019

(65) Prior Publication Data

US 2020/0401308 A1 Dec. 24, 2020

(30) Foreign Application Priority Data

Jun. 20, 2019 (CN) .......................... 201910535485.7

(51) Int. Cl.
*G06F 3/041* (2006.01)

(52) U.S. Cl.
CPC .... *G06F 3/041662* (2019.05); *G06F 3/04186* (2019.05)

(58) Field of Classification Search
CPC ............... G06F 3/412; G06F 3/041662; G06F 3/04186; G06F 3/044; G06F 3/047
USPC .................................................. 345/173, 174
See application file for complete search history.

(56) References Cited

U.S. PATENT DOCUMENTS

| | | | |
|---|---|---|---|
| 8,933,907 B2 * | 1/2015 | Hanauer | G06F 3/041662 345/174 |
| 9,323,407 B2 * | 4/2016 | Midholt | G06F 3/03545 |
| 2015/0261356 A1 * | 9/2015 | Shepelev | G06F 3/04162 345/174 |
| 2017/0160868 A1 * | 6/2017 | Kim | G06F 3/0416 |
| 2018/0275794 A1 * | 9/2018 | Takada | G06F 3/041661 |
| 2019/0050045 A1 | 2/2019 | Jha et al. | |

FOREIGN PATENT DOCUMENTS

| | | |
|---|---|---|
| CN | 104252273 A | 12/2014 |
| CN | 104536627 A | 4/2015 |
| CN | 104679336 A | 6/2015 |
| CN | 104991673 A | 10/2015 |
| CN | 105164618 A | 12/2015 |
| CN | 109189260 A | 1/2019 |

OTHER PUBLICATIONS

Extended European Search Report in Application No. 20150734.0, dated Jul. 20, 2020.
1st Office Action of China application No. 201910535485.7 dated Aug. 27, 2021.

* cited by examiner

*Primary Examiner* — Calvin C Ma
(74) *Attorney, Agent, or Firm* — Syncoda LLC; Feng Ma

(57) ABSTRACT

A method for scanning a touch screen includes: scanning the touch screen in a first scanning manner, the first scanning manner using a first report rate; and switching to a second scanning manner to scan the touch screen in response to detecting that the touch screen is touched in the first scanning manner, the second scanning manner using a second report rate. The number of scan regions into which the touch screen is divided in the first scanning manner is smaller than that of scan regions into which the touch screen is divided in the second scanning manner, and the first report rate is greater than or equal to the second report rate.

14 Claims, 5 Drawing Sheets

METHOD AND APPARATUS FOR SCANNING TOUCH SCREEN, AND MEDIUM

CROSS-REFERENCE TO RELATED APPLICATION

This application claims priority to Chinese Patent Application No. 201910535485.7 filed on Jun. 20, 2019, the disclosure of which is hereby incorporated by reference in its entirety.

BACKGROUND

Recently, smart terminals have more and more powerful functions, and more and more application programs are installed on the smart terminals. Many application programs are sensitive to touch response speed. That is, it is required that the touch response speed is as high as possible. For example, a majority of game software and "Snatch Red Envelopes" software require high response speed.

SUMMARY

The present disclosure relates to touch screen technologies, and more particularly, to a method and an apparatus for scanning a touch screen, and a medium.

In order to overcome problems in related technologies, the present disclosure provides a method for scanning a touch screen.

According to a first aspect of embodiments of the present disclosure, there is provided a method for scanning a touch screen, which includes:

scanning the touch screen in a first scanning manner, the first scanning manner using a first report rate; and switching to a second scanning manner to scan the touch screen in response to detecting that the touch screen is touched in the first scanning manner, the second scanning manner using a second report rate.

The number of scan regions into which the touch screen is divided in the first scanning manner is smaller than that of scan regions into which the touch screen is divided in the second scanning manner, and the first report rate is greater than or equal to the second report rate.

According to a second aspect of the embodiments of the present disclosure, there is provided an apparatus for scanning a touch screen, which includes:

a first scanning unit, configured to scan the touch screen in a first scanning manner, the first scanning manner using a first report rate; and a second scanning unit, configured to scan the touch screen in a second scanning manner when the first scanning unit detects that the touch screen is touched, the second scanning manner using a second report rate.

The number of scan regions into which the touch screen is divided in the first scanning manner is smaller than that of scan regions into which the touch screen is divided in the second scanning manner, and the first report rate is greater than or equal to the second report rate.

According to a third aspect of the embodiments of the present disclosure, there is provided an apparatus for scanning a touch screen, which includes:

a processor, and a memory, configured to store instructions executable by the processor.

The processor is configured to:

scan the touch screen in a first scanning manner, the first scanning manner using a first report rate; and switch to a second scanning manner to scan the touch screen in response to detecting that the touch screen is touched in the first scanning manner, the second scanning manner using a second report rate.

The number of scan regions into which the touch screen is divided in the first scanning manner is smaller than that of scan regions into which the touch screen is divided in the second scanning manner, and the first report rate is greater than or equal to the second report rate.

According to a fourth aspect of the embodiments of the present disclosure, there is provided a non-transitory computer-readable storage medium, wherein instructions in the storage medium are executed by a processor of a terminal such that the terminal can execute a method for scanning a touch screen, the method including:

scanning the touch screen in a first scanning manner, the first scanning manner using a first report rate; and switching to a second scanning manner to scan the touch screen in response to detecting that the touch screen is touched in the first scanning manner, the second scanning manner using a second report rate.

The number of scan regions into which the touch screen is divided in the first scanning manner is smaller than that of scan regions into which the touch screen is divided in the second scanning manner, and the first report rate is greater than or equal to the second report rate.

It is to be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this disclosure, illustrate embodiments conforming to the present disclosure and, together with the specification, serve to explain the principles of the present disclosure.

DETAILED DESCRIPTION

Reference will now be made in detail to exemplary embodiments, examples of which are illustrated in the accompanying drawings. When accompanying figures are mentioned in the following descriptions, the same numbers in different drawings represent the same or similar elements, unless otherwise represented. The implementations set forth in the following description of exemplary embodiments do not represent all implementations consistent with the present disclosure. Instead, they are merely examples of apparatuses and methods consistent with some aspects related to the present disclosure as recited in the appended claims.

Existing terminal touch screens use simple scanning methods with a fixed report rate of 100 Hz or 120 Hz, etc. Therefore, in order to increase the response speed, it is needed to increase the report rate, which results in an increase in power consumption. However, saving power consumption may inevitably reduce the response speed.

Therefore, there is a need for a scanning method that can give consideration to both response speed and power consumption to meet requirements of various current application programs.

To satisfy the requirements of application programs on existing smart terminals for higher touch response speed, the present disclosure proposes a method for scanning a touch screen by reducing power consumption as much as possible. In the method of the present disclosure, it is detected whether a touch screen is touched by using a scanning manner where a report rate is higher but the number of scan regions into which the touch screen is divided, so as to achieve the objective of satisfying requirements for higher touch response speed while reducing power consumption as much as possible.

Figure 1:
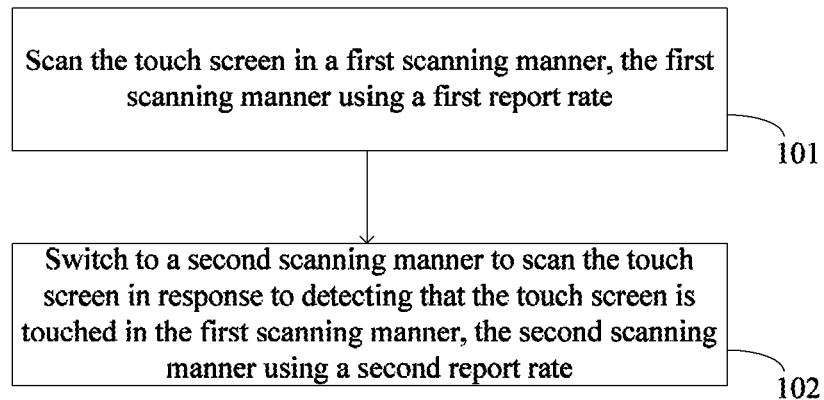
FIG. 1 illustrates a flowchart of a method for scanning a touch screen according to some embodiments.

FIG. 1 illustrates a flowchart of a method for scanning a touch screen according to some embodiments. As shown in FIG. 1, this method is applied to a terminal, including following steps.

In Step 101, the touch screen is scanned in a first scanning manner, wherein the first scanning manner uses a first report rate.

In Step 102, it is switched to a second scanning manner to scan the touch screen in response to detecting that the touch screen is touched in the first scanning manner, wherein the second scanning manner uses a second report rate.

The number of scan regions into which the touch screen is divided in the first scanning manner is smaller than that of scan regions into which the touch screen is divided in the second scanning manner, and the first report rate is greater than or equal to the second report rate.

In the method as shown in FIG. 1, instead of using one fixed scanning manner, two scanning manners are combined, such that advantages of the two scanning manners can be utilized at the same time. The first scanning manner uses a first report rate, the second scanning manner uses a second report rate, and the first report rate is greater than or equal to the second report rate. In this way, it is ensured that the first scanning manner has a higher touch response speed than the second scanning manner. The number of scan regions into which the touch screen is divided in the first scanning manner is smaller than that of scan regions into which the touch screen is divided in the second scanning manner. In this way, it is ensured that the quantity of data to be processed in the first scanning manner is less than the quantity of data to be processed in the second scanning manner, and the power consumption is reduced accordingly. Therefore, scanning by using the first scanning manner can meet the requirements for high response speed and low power consumption.

It is switched to the second scanning manner to scan when it is detected that the touch screen is touched in the first scanning manner. The number of scan regions into which the touch screen is divided in the second scanning manner is greater than that of scan regions into which the touch screen is divided in the first scanning manner. Therefore, in this case, using the second scanning manner can implement a more accurate finger position detection.

In an alternative embodiment, the first scanning manner is a self-capacitance scanning manner, and the second scanning manner is a mutual-capacitance scanning manner. A report rate of such as 240 Hz may be set for the self-capacitance scanning manner, and a report rate of such as 120 Hz or 240 Hz may be set for the mutual-capacitance scanning manner. In the second scanning manner, the report rate may be adaptively selected according to the type of an application program currently displayed on the touch screen. For application programs that are sensitive to touch response speed (such as an application program of "Snatch Red Envelopes"), the report rate of 240 Hz may be used. For application programs that are not sensitive to touch response speed (i.e., some common application programs), the report rate of 120 Hz may be used.

Figure 2:
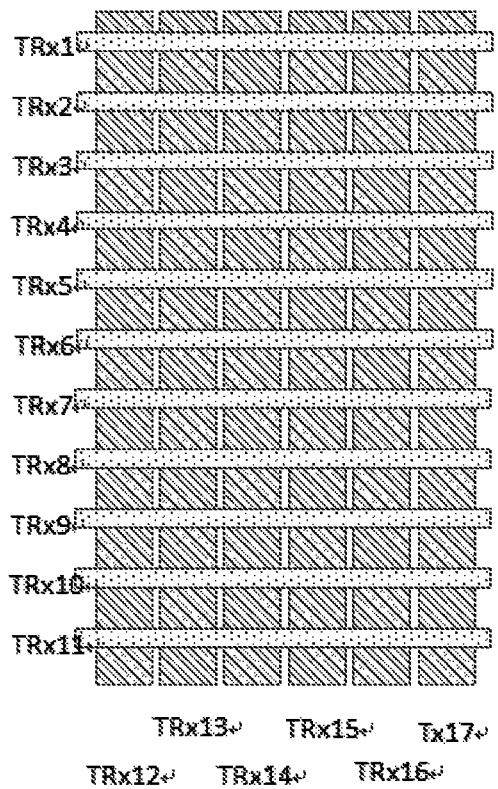
FIG. 2 illustrates a schematic diagram of a self-capacitance scanning manner according to some embodiments.
Figure 3:
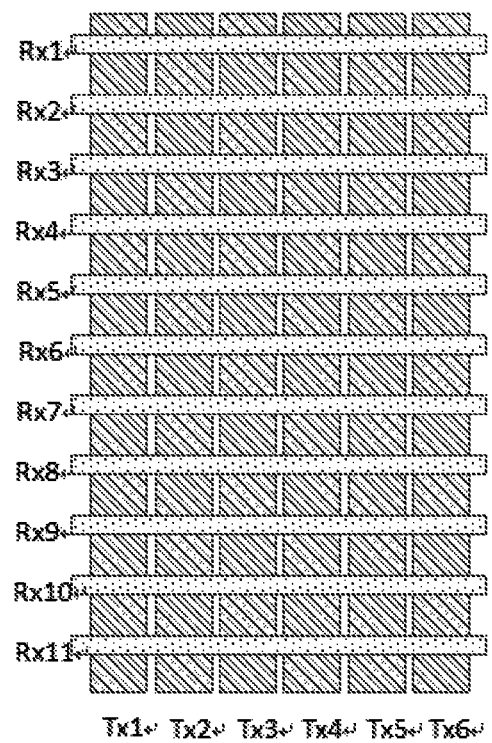
FIG. 3 illustrates a schematic diagram of a mutual-capacitance scanning manner according to some embodiments.

In the self-capacitance scanning manner, as shown in FIG. 2, for example, the entire screen is divided into 16 channels in an X-axis direction and a Y-axis direction respectively, i.e., TRx1, TRx2, . . . , and TRx16. For each channel, such a principle applies: the quantity of information to be scanned and processed is equal to the number of channels (6) in the X-axis plus the number of channels (11) in the Y-axis. Therefore, in the self-capacitance scanning manner, the quantity of data processed is smaller. In the mutual-capacitance scanning manner, as shown in FIG. 3, for example, the entire screen is divided into 6*11 regions. That is, a two-dimensional matrix is formed. In this manner, the quantity of data processed is 66, which is far greater than the quantity of data processed in the self-capacitance scanning manner. As can be seen, using the self-capacitance scanning manner can save power consumption.

Therefore, when the first scanning manner uses the self-capacitance scanning manner and the second scanning manner uses the mutual-capacitance scanning manner, scanning by using the self-capacitance scanning manner with a high report rate may meet the requirements for high response speed and low power consumption. In the meanwhile, after it is detected that the touch screen is touched, scanning by using the mutual-capacitance scanning manner with a low report rate may meet the requirement for accurate positioning. Specifically, in the self-capacitance scanning manner, the response speed of the report rate 240 Hz is about 4.15 ms quicker than that of the report rate 120 Hz.

In the method of the present disclosure, an organic combination of the two scanning manners having different characteristics and effects not only satisfies the requirements of existing response speed-sensitive application programs for response speed, but also reduces power consumption.

In an alternative embodiment, before the scanning the touch screen in a first scanning manner, the method further includes:

determining, based on a usage state of the touch screen, to scan the touch screen in the first scanning manner.

In specific applications, not all application programs have so high requirements for touch response speed and power consumption. Therefore, before using the scanning method as shown in FIG. 1, it may be first determined whether it is needed to use this scanning manner characterized by high response speed and low power consumption. If necessary, the scanning process is performed using the method as shown in FIG. 1. Otherwise, a conventional scanning method is employed to scan, for example, the mutual-capacitance scanning manner.

In an alternative embodiment, the determining, based on a usage state of the touch screen, to scan the touch screen in the first scanning manner includes at least one of following manners:

in a first manner, determining whether an application program displayed on the touch screen is a touch response speed-sensitive application program, and determining to scan the touch screen in the first scanning manner if the determination result is yes; and in a second manner, determining whether a current available power of the touch screen is less than a preset threshold, and determining to scan the touch screen in the first scanning manner if the determination result is yes.

In the first manner, it may be determined whether an application program displayed on the current display interface of the touch screen is a touch response speed-sensitive program by the following two methods: (1) presetting the type of each application program and storing the application program in the system, and directly searching the type of an application program from a list of pre-stored programs and types thereof; and (2) setting one or more determination conditions for each application program, wherein when attributes of an application program satisfy these determination conditions (or satisfy at least N determination conditions among these determination conditions, wherein N is a natural number greater than or equal to 1), it is determined that this application program is a response speed-sensitive program.

In the second manner, when the current available power of the touch screen (such as the current available power of a terminal where the touch screen is) is lower, the scanning manner as shown in FIG. 1 may be employed to save power consumption. The preset threshold may be preset according to actual needs.

In an alternative embodiment, after the switching to a second scanning manner to scan the touch screen, the method further includes:

switching to the first scanning manner to scan the touch screen in response to detecting, in the second scanning manner, that the touch screen is not touched within a preset time period.

The preset time period may be preset according to actual needs. In this embodiment, when a finger leaves the touch screen and does not operate any more, it is switched to the first scanning manner to detect the finger touch situation at a higher response speed while reducing power consumption.

Figure 4:
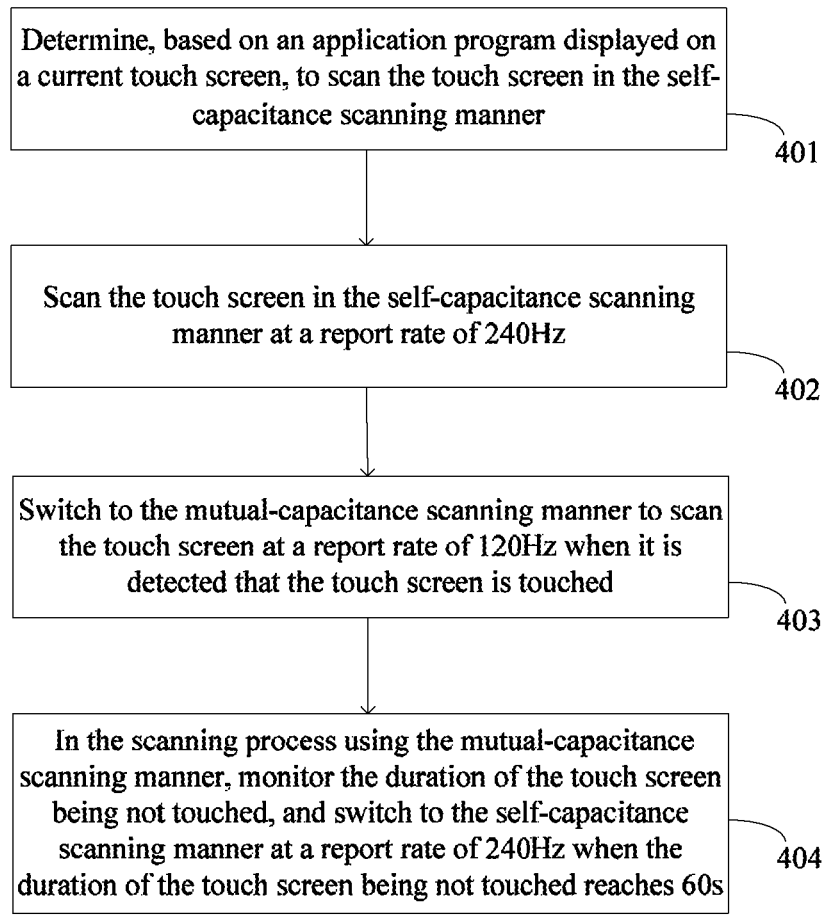
FIG. 4 illustrates a flowchart of a method for scanning a touch screen according to some other embodiments.

FIG. 4 illustrates a specific flowchart of a method for scanning a touch screen according to a specific embodiment. In this embodiment, the first scanning manner uses a self-capacitance scanning manner, and the second scanning manner uses a mutual-capacitance scanning manner. As shown in FIG. 4, this method includes following steps.

In Step 401, because the application program displayed on the current touch screen is a program of "Snatch Red Envelopes", it is determined to scan the touch screen in the self-capacitance scanning manner.

In Step 402, the touch screen is scanned in the self-capacitance scanning manner at a report rate of 240 Hz.

In Step 403, when it is detected that the touch screen is touched, it is switched to the mutual-capacitance scanning manner to scan the touch screen at a report rate of 120 Hz.

In Step 404, in the scanning process using the mutual-capacitance scanning manner, the duration of the touch screen being not touched is monitored. When the duration of the touch screen being not touched reaches 60 seconds, it is switched to the self-capacitance scanning manner with a report rate of 240 Hz.

In the present disclosure, scanning by using the first scanning manner with a high report rate may meet the requirements for high response speed and low power consumption. In the meanwhile, after it is detected that the touch screen is touched, scanning by using the second scanning manner with a low report rate may meet the requirement for accurate positioning. An organic combination of the two scanning manners having different characteristics and effects not only satisfies the requirements of existing response speed-sensitive application programs for response speed, but also reduces power consumption.

Figure 5:
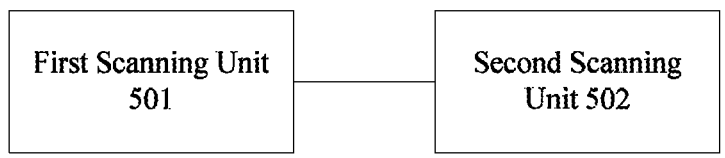
FIG. 5 illustrates a block diagram of an apparatus for scanning a touch screen according to some embodiments.

FIG. 5 illustrates a block diagram of an apparatus for scanning a touch screen according to some embodiments. Referring to FIG. 5, this apparatus includes:

a first scanning unit 501, configured to scan the touch screen in a first scanning manner, the first scanning manner using a first report rate; and a second scanning unit 502, configured to scan the touch screen in a second scanning manner when the first scanning unit 501 detects that the touch screen is touched, the second scanning manner using a second report rate.

The number of scan regions into which the touch screen is divided in the first scanning manner is smaller than that of scan regions into which the touch screen is divided in the second scanning manner, and the first report rate is greater than or equal to the second report rate.

In an alternative embodiment, the first scanning manner is a self-capacitance scanning manner, and the second scanning manner is a mutual-capacitance scanning manner.

In an alternative embodiment, the first report rate is 240 Hz, and the second report rate is 120 Hz or 240 Hz.

In an alternative embodiment, the apparatus further includes:

a determining unit, configured to determine, based on a usage state of the touch screen, to scan the touch screen by the first scanning unit 501 in the first scanning manner.

In an alternative embodiment, the determining unit is further configured to determine, based on the usage state of the touch screen, to scan the touch screen in the first scanning manner in at least one of following manners:

in a first manner, determining whether an application program displayed on the touch screen is a touch response speed-sensitive application program, and determining to scan the touch screen by the first scanning unit 501 in the first scanning manner if the determination result is yes; and in a second manner, determining whether a current available power of the touch screen is less than a preset threshold, and determining to scan the touch screen by the first scanning unit 501 in the first scanning manner if the determination result is yes.

In an alternative embodiment, the first scanning unit 501 is further configured to:

scan the touch screen in the first scanning manner when the second scanning unit 502 detects that the touch screen is not touched within a preset time period.

With regard to the apparatus in the above embodiments, specific implementations for executing operations by modules thereof have been described in detail in the embodiments related to the method, and thus are not elaborated herein.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Figure 6:
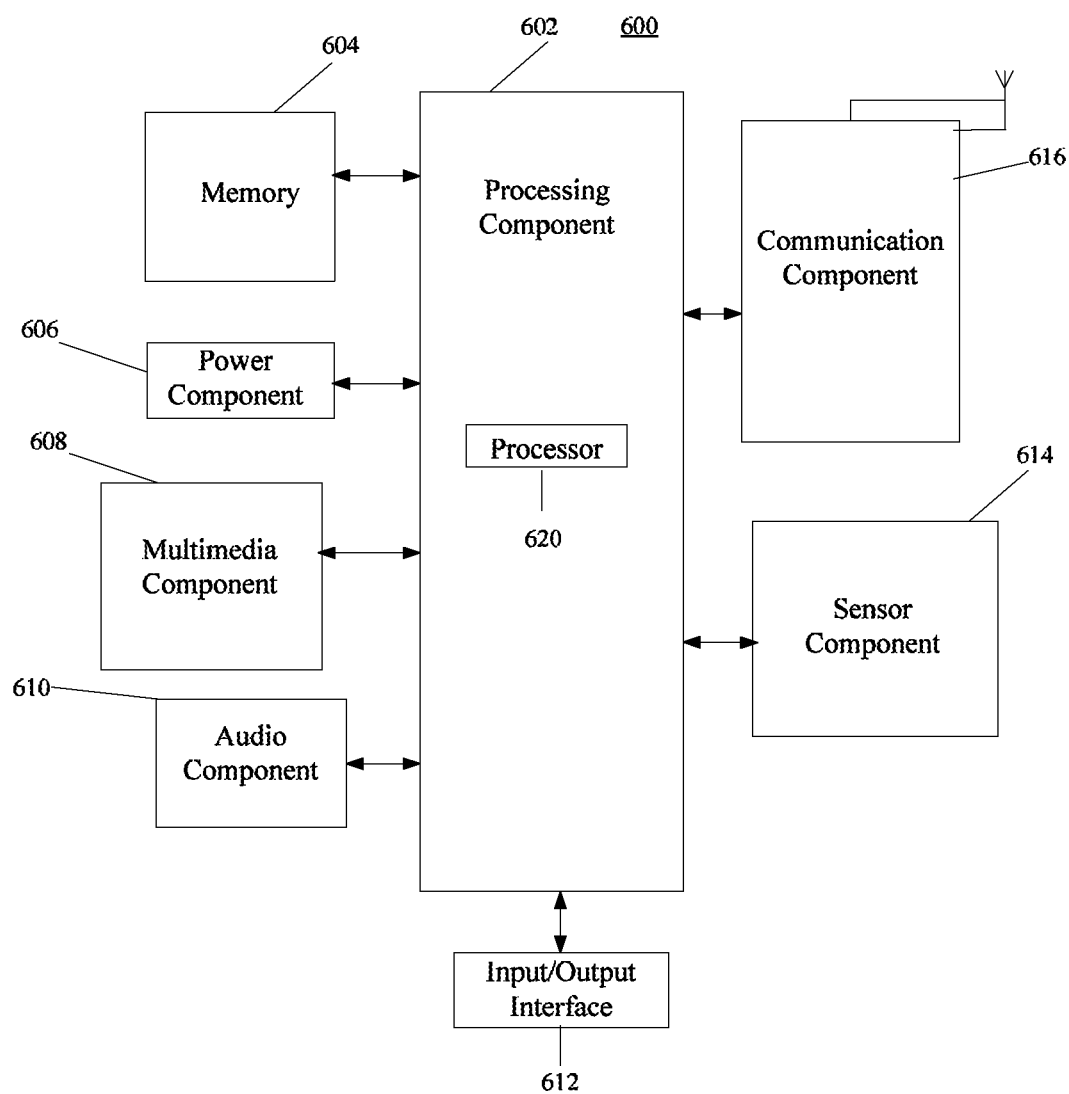
FIG. 6 illustrates a block diagram of an apparatus according to some embodiments.

FIG. 6 illustrates a block diagram of an apparatus 600 for scanning a touch screen according to some embodiments. For example, the apparatus 600 may be a mobile phone, a computer, a digital broadcast terminal, a message transceiver device, a game console, a tablet device, a medical equipment, a fitness equipment, a personal digital assistant, and the like.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen which provides an output interface between the apparatus 600 and the user. In some embodiments, the screen may include a liquid crystal display (LCD) and a touch panel (TP). In some embodiments, an organic light-emitting diode (OLED) display or other types of displays can be adopted.

If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 608 includes a front camera and/or a rear camera. The front camera and/or the rear camera may receive an external multimedia datum while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For example, the sensor component 614 may detect the on/off state of the apparatus 600, relative locations of components, for example, the components are the displayer and keypads of the apparatus 600. The sensor component 614 may further sense the position change of a component of the apparatus 600 or the position change of the apparatus 600, whether the touch exists between the user and the apparatus 600, the direction or acceleration/deceleration of the apparatus 600, and temperature change of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the apparatus 600, for performing the above-described methods. For example, the non-transitory computer-readable storage medium may be a ROM, a RAM, a CD-ROM, a magnetic tape, a floppy disc, an optical data storage device, and the like.

There is provided a non-transitory computer-readable storage medium, wherein instructions in the storage medium are executed by a processor of a mobile terminal such that the mobile terminal can execute a method for scanning a touch screen. The method includes: scanning the touch screen in a first scanning manner, the first scanning manner using a first report rate; and switching to a second scanning manner to scan the touch screen in response to detecting that the touch screen is touched in the first scanning manner, the second scanning manner using a second report rate. The number of scan regions into which the touch screen is divided in the first scanning manner is smaller than that of scan regions into which the touch screen is divided in the second scanning manner, and the first report rate is greater than or equal to the second report rate.

Figure 7:
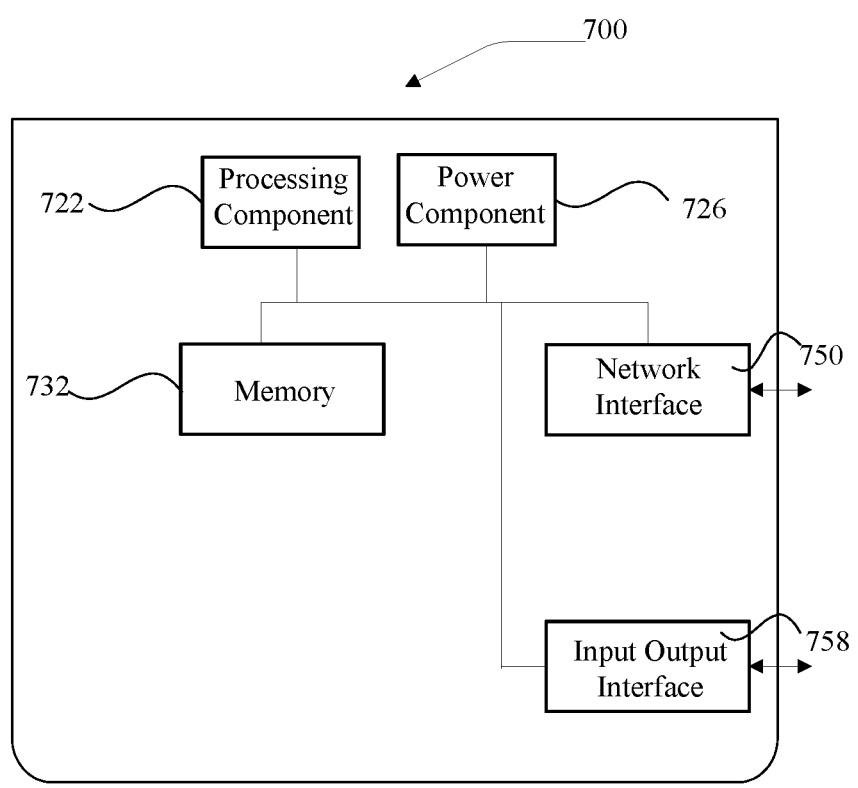
FIG. 7 illustrates a block diagram of an apparatus according to some embodiments.

FIG. 7 illustrates a block diagram of an apparatus 700 for scanning a touch screen according to some embodiments. For example, the apparatus 700 may be provided with a server. Referring to FIG. 7, the apparatus 700 includes a processing component 722, and further includes one or more processors, and memory resource represented by a memory 732 and configured to store an instruction that can be executed by the processing component 722, for example, an application program. The application program stored in the memory 732 may include one or more modules each of which is corresponding to a set of instructions. Moreover, the processing component 722 is configured to execute the instructions to scan the touch screen in a first scanning manner, the first scanning manner using a first report rate, and switch to a second scanning manner to scan the touch screen in response to detecting that the touch screen is touched in the first scanning manner, the second scanning manner using a second report rate. The number of scan regions into which the touch screen is divided in the first scanning manner is smaller than that of scan regions into which the touch screen is divided in the second scanning manner, and the first report rate is greater than or equal to the second report rate.

The apparatus 700 may also include a power component 726 configured to execute the power management of the apparatus 700, a wired or wireless network interface 750 configured to connect the apparatus 700 to the network, and an input/output (I/O) interface 758. The device 700 can operate an operating system based on and stored in the memory 732, for example, Windows Server™, Mac OS X™ Unix™, Linux™, FreeBSD™ or other similar operating systems.

In one or more embodiment, the first scanning manner is a self-capacitance scanning manner, and the second scanning manner is a mutual-capacitance scanning manner.

In one or more embodiment, the first report rate is 240 Hz, and the second report rate is 120 Hz or 240 Hz.

In one or more embodiment, before the scanning the touch screen in a first scanning manner, the method further includes: determining, based on a usage state of the touch screen, to scan the touch screen in the first scanning manner.

In one or more embodiment, the determining, based on a usage state of the touch screen, to scan the touch screen in the first scanning manner includes at least one of following manners: in a first manner, determining whether an application program displayed on the touch screen is a touch response speed-sensitive application program, and determining to scan the touch screen in the first scanning manner if the determination result is yes; and in a second manner, determining whether a current available power of the touch screen is less than a preset threshold, and determining to scan the touch screen in the first scanning manner if the determination result is yes.

In one or more embodiment, after the switching to a second scanning manner to scan the touch screen, the method further includes: switching to the first scanning manner to scan the touch screen in response to detecting, in the second scanning manner, that the touch screen is not touched within a preset time period.

In one or more embodiment, the apparatus further includes: a determining unit, configured to determine, based on a usage state of the touch screen, to scan the touch screen by the first scanning unit in the first scanning manner.

In one or more embodiment, the determining unit is further configured to determine, based on the usage state of the touch screen, to scan the touch screen in the first scanning manner in at least one of following manners: in a first manner, determining whether an application program displayed on the touch screen is a touch response speed-sensitive application program, and determining to scan the touch screen by the first scanning unit in the first scanning manner if the determination result is yes; and in a second manner, determining whether a current available power of the touch screen is less than a preset threshold, and determining to scan the touch screen by the first scanning unit in the first scanning manner if the determination result is yes.

In one or more embodiment, the first scanning unit is further configured to: scan the touch screen in the first scanning manner when the second scanning unit detects that the touch screen is not touched within a preset time period.

Various embodiments of the present disclosure can have one or more of the following advantages. Scanning by using the first scanning manner with a high report rate can meet the requirements for high response speed and low power consumption. In the meanwhile, after it is detected that the touch screen is touched, scanning by using the second scanning manner with a low report rate may meet the requirement for accurate positioning. An organic combination of the two scanning manners having different characteristics and effects not only satisfies the requirements of existing response speed-sensitive application programs for response speed, but also reduces power consumption.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for scanning a touch screen, comprising:
scanning the touch screen in a first scanning manner, the first scanning manner using a first report rate; and
switching to a second scanning manner to scan the touch screen in response to detecting, in the first scanning manner, that the touch screen is touched, the second scanning manner using a second report rate;
wherein a number of scan regions into which the touch screen is divided in the first scanning manner is smaller than another number of scan regions into which the touch screen is divided in the second scanning manner, and the first report rate is greater than or equal to the second report rate, and
wherein before the scanning the touch screen in a first scanning manner, the method further comprises:
determining, in response to detecting that a current available power of the touch screen is less than a preset threshold, to scan the touch screen in the first scanning manner.

2. The method according to claim 1, wherein the first scanning manner is a self-capacitance scanning manner, and the second scanning manner is a mutual-capacitance scanning manner.

3. The method according to claim 2, wherein the first report rate is 240 Hz, and the second report rate is 120 Hz or 240 Hz.

4. The method according to claim 1, wherein after the switching to a second scanning manner to scan the touch screen, the method further comprises:
switching to the first scanning manner to scan the touch screen in response to detecting, in the second scanning manner, that the touch screen is not touched within a preset time period.

5. An apparatus for scanning a touch screen, comprising:
a processor, and
a memory, configured to store instructions executable by the processor;
wherein the processor is configured to:
scan the touch screen in a first scanning manner, the first scanning manner using a first report rate; and
switch to a second scanning manner to scan the touch screen in response to detecting, in the first scanning manner, that the touch screen is touched, the second scanning manner using a second report rate;
wherein a number of scan regions into which the touch screen is divided in the first scanning manner is smaller than another number of scan regions into which the touch screen is divided in the second scanning manner, and the first report rate is greater than or equal to the second report rate, and
wherein the processor is further configured to:
determine, in response to detecting that a current available power of the touch screen is less than a preset threshold, to scan the touch screen in the first scanning manner.

6. The apparatus according to claim 5, wherein the first scanning manner is a self-capacitance scanning manner, and the second scanning manner is a mutual-capacitance scanning manner.

7. The apparatus according to claim 6, wherein the first report rate is 240 Hz, and the second report rate is 120 Hz or 240 Hz.

8. The apparatus according to claim 5, wherein the processor is further configured to:
switch to the first scanning manner to scan the touch screen in response to detecting, in the second scanning manner, that the touch screen is not touched within a preset time period.

9. A non-transitory computer-readable storage medium, wherein instructions in the storage medium are executed by a processor of a terminal such that the terminal can execute a method for scanning a touch screen, the method comprising:
scanning the touch screen in a first scanning manner, the first scanning manner using a first report rate; and
switching to a second scanning manner to scan the touch screen in response to detecting, in the first scanning manner, that the touch screen is touched, the second scanning manner using a second report rate;
wherein a number of scan regions into which the touch screen is divided in the first scanning manner is smaller than another number of scan regions into which the touch screen is divided in the second scanning manner, and the first report rate is greater than or equal to the second report rate, and
wherein before the scanning the touch screen in a first scanning manner, the method further comprises:
determining, in response to detecting that a current available power of the touch screen is less than a preset threshold, to scan the touch screen in the first scanning manner.

10. The storage medium according to claim 9, wherein the first scanning manner is a self-capacitance scanning manner, and the second scanning manner is a mutual-capacitance scanning manner.

11. The storage medium according to claim 10, wherein the first report rate is 240 Hz, and the second report rate is 120 Hz or 240 Hz.

12. The storage medium according to claim 9, wherein after the switching to a second scanning manner to scan the touch screen, the method further comprises:
switching to the first scanning manner to scan the touch screen in response to detecting, in the second scanning manner, that the touch screen is not touched within a preset time period.

13. A mobile terminal implementing the method according to claim 1, comprising the touch screen, wherein the mobile terminal is configured to scan by using the first scanning manner with a high report rate to meet requirements for high response speed and low power consumption.

14. The mobile terminal according to claim 13, wherein the mobile terminal is configured to, after detecting that the touch screen is touched, scan by using the second scanning manner with a low report rate to meet requirement for accurate positioning.

* * * * *